United States Patent
Shaw et al.

(10) Patent No.: US 9,898,203 B2
(45) Date of Patent: Feb. 20, 2018

(54) REPLACING DATA STRUCTURES FOR PROCESS CONTROL

(71) Applicant: Oracle International Corporation, Redwood Shores, CA (US)

(72) Inventors: Howard Shaw, Encinitas, CA (US); Sudhir Arthanat, Bangalore (IN); Harish Jaya Kovoor, Bangalore (IN); Loida Chez, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 76 days.

(21) Appl. No.: 15/160,286

(22) Filed: May 20, 2016

(65) Prior Publication Data

US 2017/0336972 A1    Nov. 23, 2017

(51) Int. Cl.
*G06F 3/06* (2006.01)
*G06F 12/02* (2006.01)
*G06F 17/30* (2006.01)

(52) U.S. Cl.
CPC .............. *G06F 3/061* (2013.01); *G06F 3/065* (2013.01); *G06F 3/067* (2013.01); *G06F 3/0619* (2013.01);
(Continued)

(58) Field of Classification Search
CPC ...... G06F 3/061; G06F 3/0613; G06F 3/0629; G06F 3/0634; G06F 3/0646; G06F 12/0253; G06F 17/30595
See application file for complete search history.

(56) References Cited

U.S. PATENT DOCUMENTS

| 8,392,280 B1 | 3/2013 | Kilshaw |
| 2004/0236587 A1 | 11/2004 | Nalawade |

(Continued)

FOREIGN PATENT DOCUMENTS

| WO | 2000043937 A2 | 7/2000 |
| WO | 2003003163 A2 | 1/2003 |
| WO | 2008027887 A2 | 3/2008 |

OTHER PUBLICATIONS

Denver Tax Software, Inc., Guide to the Lease Vs. Buy Analyzer, [Copyright 1995-2011. Retrieved from the internet: http://www.denvertax.com/files/manuals/manwlb.pdf].

(Continued)

*Primary Examiner* — Hal Schnee
(74) *Attorney, Agent, or Firm* — Kilpatrick Townsend & Stockton LLP

(57) ABSTRACT

A method of replacing information governing transactions between computer systems may include storing a first data structure comprising first information that governs an active process of transactions between the computer systems, and cloning the first data structure to generate a second data structure. The method may also include receiving changes to the second information. The method may additionally include processing the first and second data structures using a simulation process to generate a first and second result set including simulation results of transactions between the computer systems over a future time interval as governed by the first and second information. The method may also include causing the first result set and the second result set to be comparatively displayed together, receiving a selection associated with the second result set, and replacing the first data structure with the second data structure to govern the active process.

20 Claims, 15 Drawing Sheets

(52) U.S. Cl.
CPC .... *G06F 12/0253* (2013.01); *G06F 17/30595* (2013.01)

(56) References Cited

U.S. PATENT DOCUMENTS

| | | | |
|---|---|---|---|
| 2005/0187851 A1* | 8/2005 | Sant | G06Q 40/06 705/36 R |
| 2007/0094107 A1 | 4/2007 | Franklin et al. | |
| 2007/0106710 A1* | 5/2007 | Haustein | G06F 3/0605 |
| 2008/0319894 A1 | 12/2008 | Karklin | |
| 2009/0031308 A1* | 1/2009 | Busche | G06F 9/4843 718/101 |
| 2010/0036831 A1* | 2/2010 | Vemuri | G06F 17/30516 707/707 |
| 2011/0138144 A1* | 6/2011 | Tamura | G06F 3/0608 711/166 |
| 2011/0218934 A1* | 9/2011 | Elser | G06Q 40/02 705/36 R |
| 2012/0109847 A1 | 5/2012 | Hemenway | |
| 2012/0123764 A1* | 5/2012 | Ito | G06F 9/5055 703/21 |
| 2013/0275985 A1* | 10/2013 | Lim | G06F 9/466 718/101 |
| 2013/0304655 A1 | 11/2013 | Johnston et al. | |
| 2016/0124483 A1* | 5/2016 | Matthey | G05B 15/02 700/291 |
| 2017/0286578 A1* | 10/2017 | Lee | G06F 17/5009 |
| 2017/0287074 A1* | 10/2017 | Aber | G06Q 40/04 |

OTHER PUBLICATIONS

Argus Software, "Argus Leasing Suite", [Accessed on Jan. 23, 2014. Retrieved from the internet: http://www.argussoftware.com/en/products/ARGUSLS/defauft.aspx].

CRE Apps, "LeaseMatrix Dead Simple Lease Analysis", The CRE App Review, [Accessed on Jan. 23, 2014. Retrieved from the internet: http://cre-apps.com/2012/07/tease-analysis-software/].

Rei Wise, "Lease Analysis Overview", Real Estate Investment Software—Marketing and Investment Analysis Tool, [Accessed on Jan. 23, 2014. Retrieved from the internet: http://www.reiwise.com/claOverview.aspx].

Rei Wise, "Comparative Lease Analysis", Real Estate Investment Software, <Accessed on Jul. 19, 2016. Retrieved from the internet: http://www.reiwise.com/Images/claPackage.pdf].

Yardi Voyager, "Commercial Property Management Software", [Copyright 2010. Retrieved from the internet: http://www.yardi.com/DMS/UK_Commercial_Property_Management_Brochure.pdf\.

* cited by examiner

REPLACING DATA STRUCTURES FOR PROCESS CONTROL

BACKGROUND

In many different applications, data may be passed back and forth between computer system as a part of an ongoing and active process of data transactions. The timing and/or substance of data passed back and forth between computer systems may vary from application to application. However, the timing and/or substance of these data transactions may generate substantially different result sets over time.

BRIEF SUMMARY

In some embodiments, a method of replacing information governing transactions between computer systems may include storing a first data structure comprising first information that governs an active process of transactions between the computer systems, and cloning the first data structure to generate a second data structure. The second data structure may include second information that is a clone of the first information. The method may also include receiving changes to the second information such that the second information of the second data structure is different from the first information of the first data structure. The method may additionally include processing the first data structure using a simulation process to generate a first result set including simulation results of transactions between the computer systems over a future time interval as governed by the first information. The method may further include processing the second data structure using the simulation process to generate a second result set including simulation results of transactions between the computer systems over the future time interval as governed by the second information. The method may also include causing the first result set and the second result set to be comparatively displayed together on a display device, receiving a selection associated with the second result set, and replacing the first data structure with the second data structure to govern the active process of transactions between the computer systems.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for using and replacing a data structure that governs transactions between computer systems. The timing of data transfers and/or the values transmitted as part of an active process of transactions between computer systems can be governed by a data structure. The active process may begin with an initial data structure that includes a set of initial values, then the transactions between the computer systems can be modeled over the lifetime of the active process to generate a result set. The result set may include many different values or metrics, and can be used to judge the overall performance of the active process. The initial data structure can be cloned, and the initial values can be changed to generate alternative result sets. The result set from the initial data structure can be compared to the result sets from cloned and modified data structures to identify an optimal set of operating conditions for the active process.

The embodiments described herein provide methods, systems, and products that allow the transactions of the active process to be governed by replaceable data structures that can be simulated such that a final result set can be optimized. A first data structure that currently governs the data transactions can be cloned to generate a second data structure. The second data structure may initially include the same information that is included in the first data structure. This information can be used to populate fields in a user interface that allows for changes to be received for the information in the second data structure. This effectively alters the values stored in the second data structure compared to the first data structure. To determine how the result set of the active process would be affected when transactions are governed based on the second data structure as compared to the first data structure, both the first data structure and the second data structure can be processed by a simulation process that produces respective first and second result sets. The first and second result sets can be displayed in a comparative manner on a display device such that various values and/or metrics in the result sets can be directly compared. In some cases, the metrics in the second result set may be optimal when compared to corresponding metrics in the first data set. A selection indicating a preference for the second result set can be received, and in response, the first data structure can be replaced by the second data structure. From that point forward, the second data structure may govern the transactions in the active process, and over time the active process will generate outputs consistent with the second result set.

Figure 1:
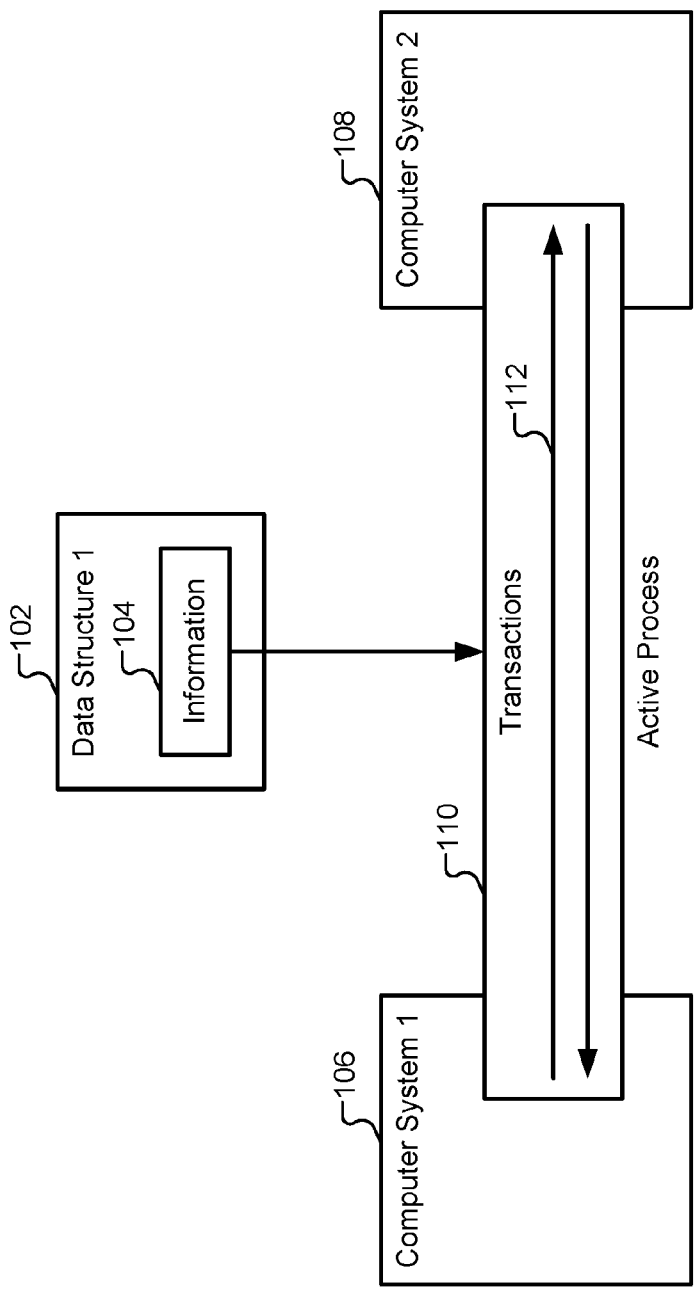
FIG. 1 illustrates a system for governing and processing data transactions, according to some embodiments.

FIG. 1 illustrates a system for governing and processing data transactions, according to some embodiments. In this simplified example, data can be passed back and forth between a first computer system 106 and a second computer system 108. The data may be passed back and forth as part of a set of transactions 112 that are scheduled and take place over a future time interval. The entire framework under which the transactions 112 are executed may be referred to as an active process 110. An example of an active process 110 and the types of transactions 112 that may be included therein will be provided in greater detail below.

A first data structure 102 may be created to govern the transactions 112. In some embodiments, the first data structure 102 may be populated with information 104 that represents a set of initial conditions for the active process 110. The information 104 may include values that control the frequency with which the transactions 112 are propagated. The information 104 may also include values that control amounts or types of data that are included in the transactions 112. In some embodiments, the information 104 may include a plurality of values that are used to calculate when transactions are executed and what is sent in each transaction.

Each of the transactions 112 in the active process 110 may include amounts or timing requirements that are easily identifiable by a user examining the first data structure 102. However, because the transactions 112 may repeat at regular intervals over a prolonged time interval and may involve external values that change over time, metrics that describe the entire lifecycle of the active process 110 may not be readily apparent. This may be the case when transaction data values and/or times are uniquely calculated for each transaction when it occurs, or when transaction data values and/or times are calculated based on the results of previous transaction data values and/or times. Therefore, a simulation process may be used to predict and accurately generate a result set that describes the active process 110 over its entire lifetime.

Figure 2:
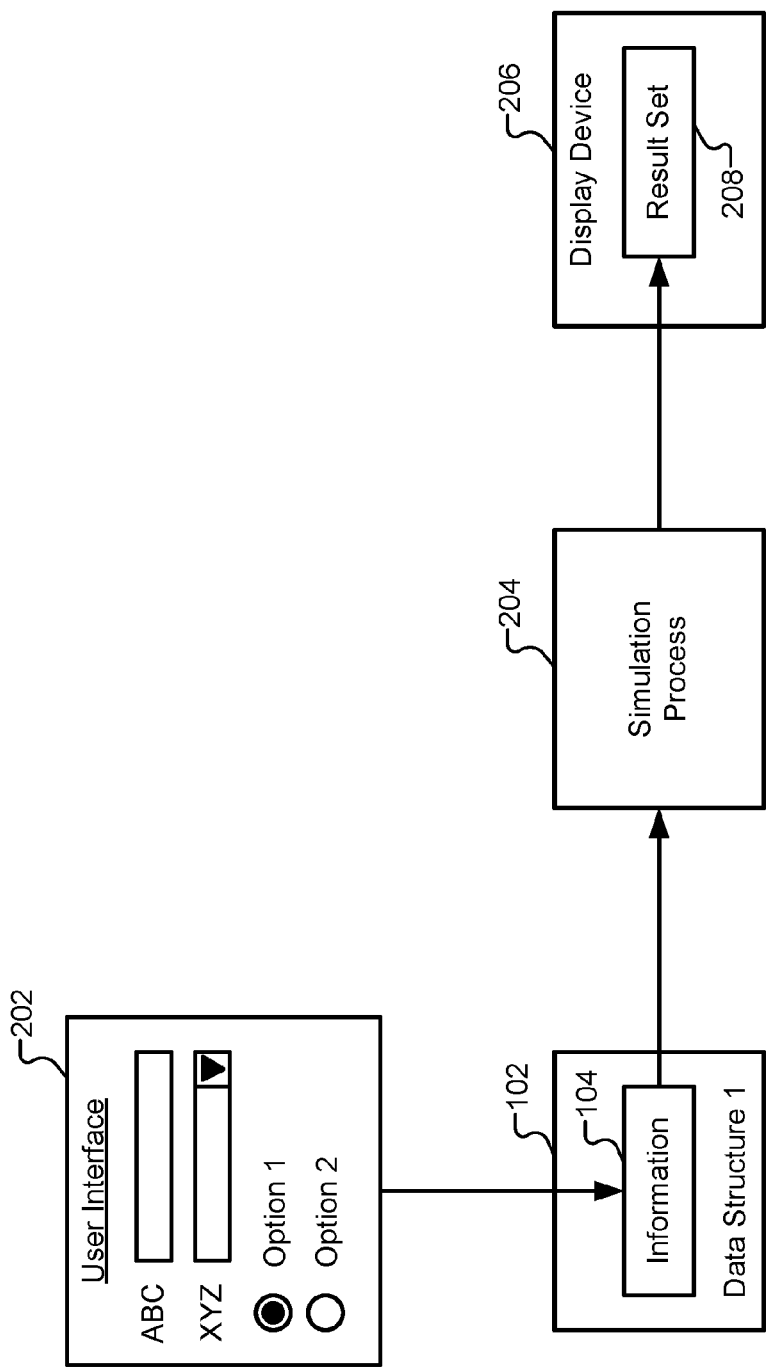
FIG. 2 illustrates a process flow for simulating an active process, according to some embodiments.

FIG. 2 illustrates a process flow for simulating the active process 110, according to some embodiments. The first data structure 102 may be generated based on a set of initial conditions for the active process 110. In some embodiments, the information 104 of the first data structure 102 may be populated by or used to populate a plurality of fields in a user interface 202. The user interface 202 may include various controls, text boxes, radio buttons, drop-down boxes, and so forth, that can be used to provide initial values for the information 104. The user interface 202 may also be prepopulated by the information 104 and used to edit the initial values for the information 104.

Once the information 104 in the first data structure 102 is set, the first data structure 102 can be provided to a simulation process 204. Using the information 104 and/or the first data structure 102 as an input, the simulation process 204 can simulate the transactions 112 executed periodically over the lifecycle of the active process 110. In some embodiments, each of the transactions 112 may build on previous transactions, or may depend on values calculated/executed in previous transactions. The simulation process 204 may be specifically designed to model the specific active process 110. In some embodiments, the simulation process 204 may include a second set of inputs that configures the simulation process 204 to simulate different types of active processes.

A result set 208 can be generated by the simulation process 204. The result set 208 may include many different types of information, including aggregate totals resulting from the transactions 112, average transaction amounts, transaction breakdowns by data type, the length of the time interval during which the active process 110 is required to execute each of the transactions 112, and so forth. A specific example of the result set 208 will be described in greater detail below. Some embodiments may cause the result set 208 to be displayed on a display device 206 such that a user or automated process can evaluate the result set 208. For example, values in the result set 208 can be compared to predetermined threshold values to determine whether the active process 110 should be initiated, modified, and/or continued.

While the result set 208 can be compared to predetermined thresholds, it may be difficult to determine whether the result set 208 is optimal without providing a meaningful comparison with other result sets. These other result sets can be generated by the simulation process 204 using different data structures comprising different information as inputs. Instead of starting from scratch with each new data structure to be simulated, optimal results can often be generated by making comparatively small changes to an existing data structure.

Figure 3:
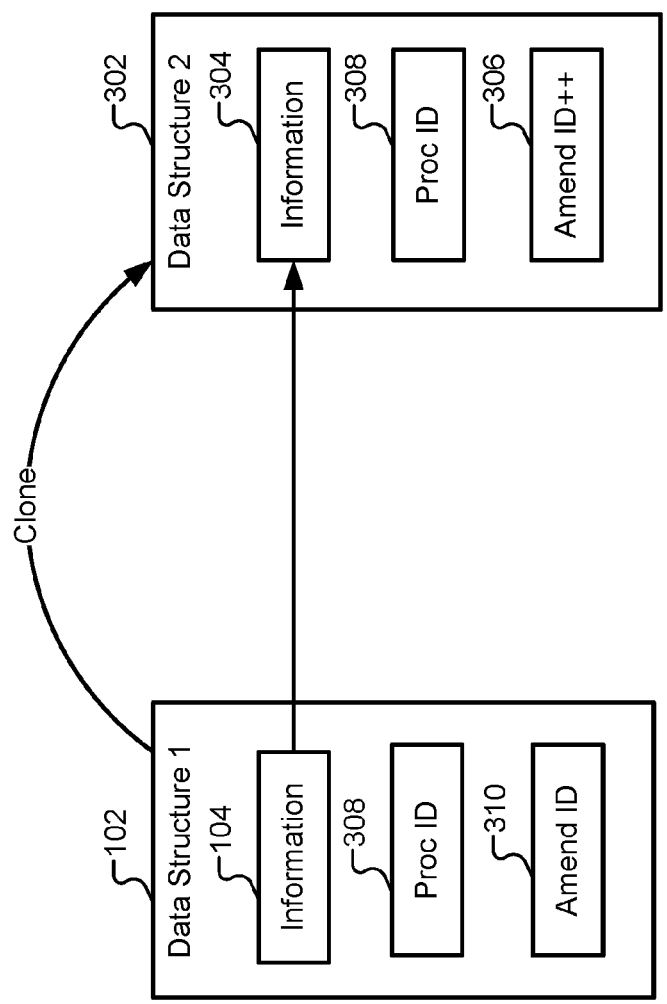
FIG. 3 illustrates a diagram of a clone of a data structure, according to some embodiments.

FIG. 3 illustrates a diagram of a clone of a data structure, according to some embodiments. The first data structure 102 may include the information 104 described above, as well as the process identifier 308 and an amendment identifier 310. The process identifier can link the first data structure 102 with the particular active process 110 for which the first data structure 102 is assigned. The amendment identifier 310 can act as a version identifier that is used to distinguish the first data structure 102 from other data structures associated with the same active process 110.

In order to generate additional data structures that can be used as inputs to the simulation process 204, the first data structure 102 can be cloned. A second data structure 302 can be generated, and the information 104 can be copied from the first data structure 102 to the second data structure 302. While the information 104 in the first data structure 102 and the information 304 in the second data structure 302 may initially be identical, changes may be received for the information 304 of the second data structure 302 in order to generate a different result set through the simulation process 204.

Because the second data structure 302 will also be associated with the same active process 110, the second data structure 302 may have the same process ID 308 as the first data structure 102. However, the amendment identifier 306 of the second data structure 302 may be different from the amendment identifier 310 of the first data structure 102. In some embodiments, a global amendment identifier may be stored for each active process. The current value of the amendment identifier may be assigned to each new data structure as an existing data structure is cloned. After assigning the amendment identifier to a new data structure, the global amendment identifier may be incremented.

Figure 4:
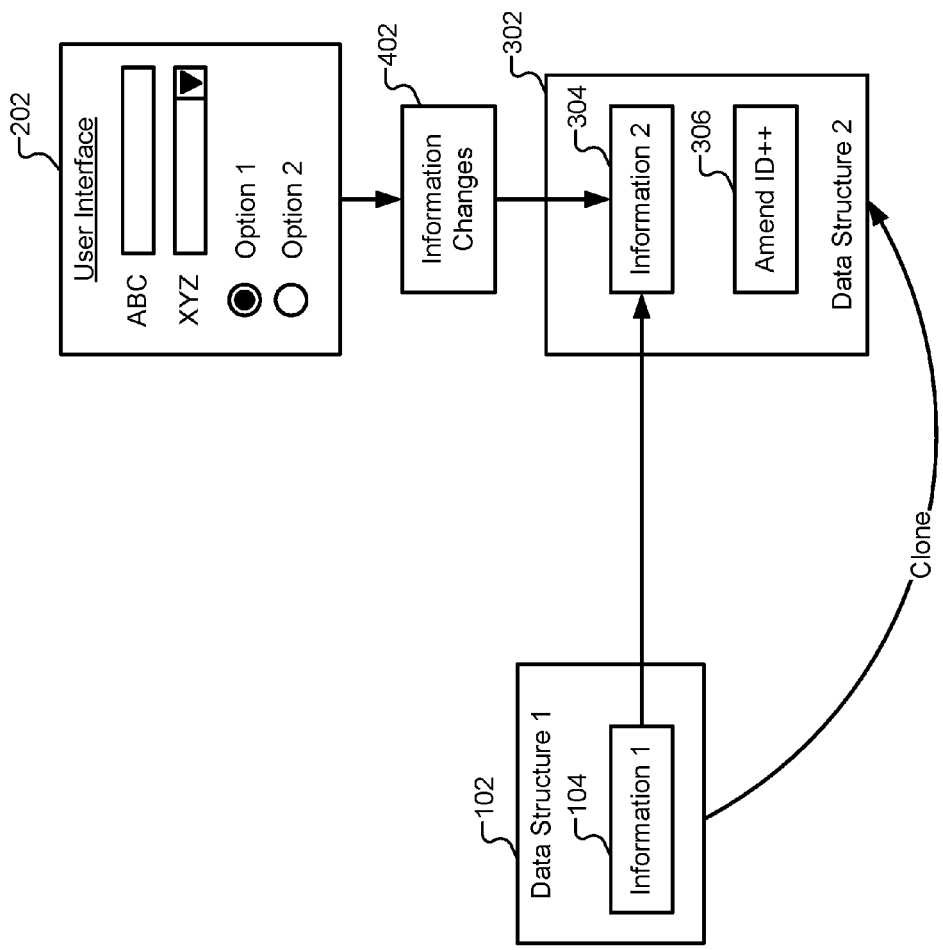
FIG. 4 illustrates a process for modifying the information in a cloned data structure, according to some embodiments.

FIG. 4 illustrates a process for modifying the information in a cloned data structure, according to some embodiments. The user interface 202 used to edit/populate the information 104 of the first data structure 102 may also be used to edit the information 304 of the second data structure 302, since the values will initially be the same. The user interface 202 may include a plurality of data fields that can be pre-populated using values from the information 304 when the user interface 202 is loaded or instantiated. As changes to the values displayed in the user interface 202 are received, the changes can be recorded as changes to the information 402. The changes to the information 402 can be stored in the information 304 of the second data structure 302. This provides a simple way for users to modify only selected values in the first data structure 102 and to see the simulated effect of those changes in the corresponding result set. By cloning the first data set, the same user interface 202 that was used to initially populate the first data structure can be reused to edit the second data structure.

Figure 5:
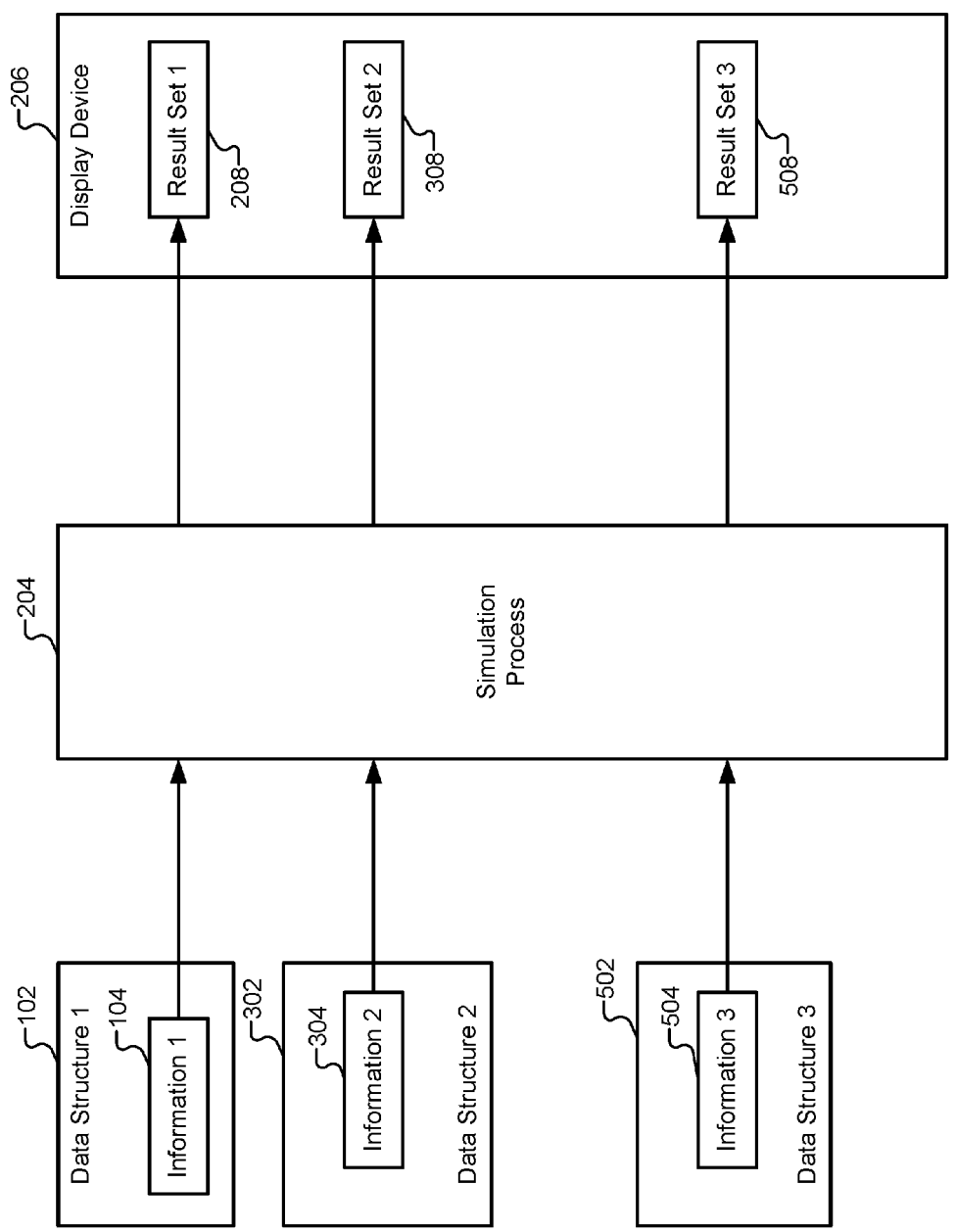
FIG. 5 illustrates how a plurality of different data structures can be provided to a simulation process, according to some embodiments.

FIG. 5 illustrates how a plurality of different data structures can be provided to the simulation process 204, according to some embodiments. Using the process described above, the first data structure 102 can be cloned one or more times and edited. For example, FIG. 5 illustrates the first data structure 102, the second data structure 302, and a third data structure 502 with corresponding information 504.

The simulation process 204 can receive portions of the information 104, 304, 504 and/or the data structures 102, 302, 502 as inputs to simulate for the active process 110. As described above, the simulation process 204 can simulate the transactions 112 that would result from the different data structures 102, 302, 502 over future time intervals. In some embodiments, the length of the time interval simulated for each data structure 102, 302, 502 may vary depending on the values provided in the information 104, 304, 504. For example, the first data structure 102 may include values that indicate a 30-year time interval, while the second data structure 302 may include values that indicate 15-year time interval.

Corresponding result sets 208, 308, 508 can be generated for each respective data structure 102, 302, 502. Instead of simply providing the result sets 208, 308, 508 individually, some embodiments may cause the result sets 208, 308, 508 to be comparatively displayed together on a display device 206. A comparative display may visually group similar result values from each of the result sets 208, 308, 508 such that the values can be quickly compared visually. One example of a comparative display of multiple result sets will be described in greater detail below.

This comparative display allows users to visually compare each of the result sets 208, 308, 508 to each other and determine which of the result sets 208, 308, 508 is optimal. Note that determining the optimal results that may not be as simple as comparing a single value for each of the result sets 208, 308, 508. Instead, identifying the optimal results may include analyzing a holistic view of comparisons between selected values in each of the result sets 208, 308, 508. Once an optimal result set has been identified, a selection may be received that is associated with that optimal result set. The selection may include selecting the corresponding data structure that generated the optimal result set and/or selecting the optimal result set itself.

Figure 6:
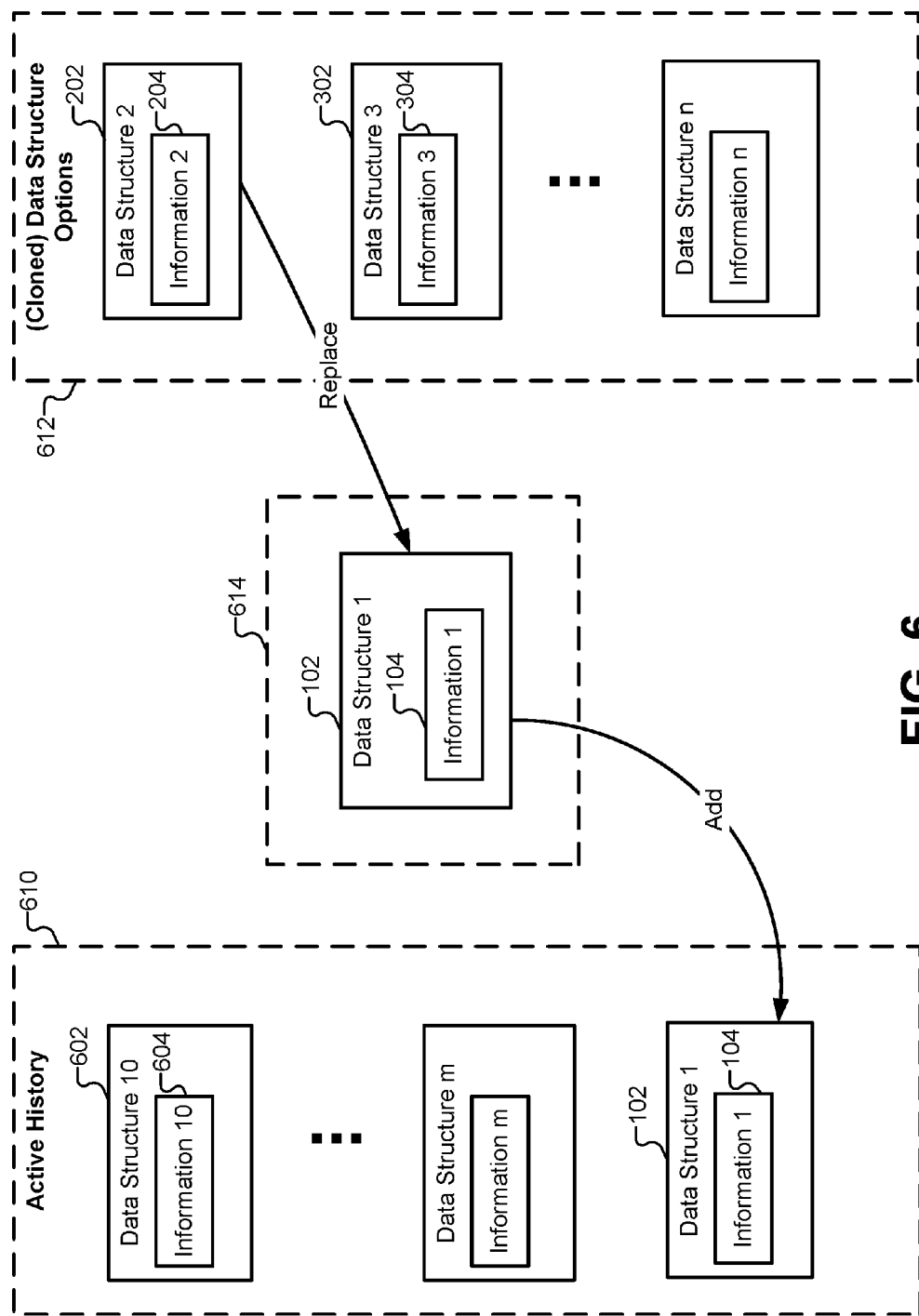
FIG. 6 illustrates how a data structure governing transactions in an active process can be replaced by a new data structure while the transactions continue, according to some embodiments.

FIG. 6 illustrates how a data structure governing the transactions 112 in the active process 110 can be replaced by a new data structure while the transactions continue, according to some embodiments. The structure illustrated by FIG. 6 provides an active history 610 of previous data structures used to govern the transactions 112 of the active process 110. This structure also maintains a library of data structure options 612 that have not yet been selected to govern the transactions 112.

The data structure currently selected as the data structure to govern the transactions 112 may be referred to as the active data structure 614. In the example of FIG. 6, the active data structure 614 is the first data structure 102. Each time the active data structure 614 is cloned and modified to form a new data structure, the new data structure can be stored in the library of data structure options 612. For example, the second data structure 202 and the third data structure 302 that were created by cloning the first data structure 102 and modifying the information 104 would be part of the library of data structure options 612. In some embodiments, each of the data structures may comprise a plurality of rows in relational databases that are linked together by keys and data values. In these embodiments, the library of data structure options 612 may not be a single formal data structure or grouping in memory of data. Instead, the library of data structure options 612 can be a logical linking of each of the data structure options by virtue of the process identifier and the amendment identifier of each data structure option. For example, the first data structure 102 may have the same process identifier as the second data structure 202 and the third data structure 302, which links each of these data structures to the active process 110 as opposed to other active processes. The second data structure 202 and the third data structure 302 can be stored in database tables that include many other data structure options for many other active processes, yet be linked to the active process 110 by virtue of the process identifier.

In order to test many different possible outcomes, many different data structure options may be created before one is selected to replace the active data structure 614. In some embodiments, data structure options may be cloned from the active data structure 614 as well as other data structure options. For example, the second data structure 202 could be cloned from the third data structure 302, with incremental changes being made between the first data structure 102, the second data structure 202, and the third data structure 302 as each is created. After displaying the corresponding result sets for the active data structure 614 and any of the selected data structure options in a comparative fashion as described above, a selection may be received corresponding to one of the data structure options. The selected data structure option can then replace the first data structure 102 as the active data structure 614.

Just as the library of data structure options 612 stores data structures that may become the active data structure 614, the active history 610 stores data structures that have previously been the active data structure 614. When the first data structure 102 is replaced as the active data structure 614, the first data structure 102 can be transferred to the active history 610. When data structures are transferred to the active history 610, additional metadata may be created and stored along with the data structures. For example, additional fields may be added to data structures, such as a time interval during which the data structure was the active data structure 614, a timestamp of when the data structure was replaced as the active data structure 614, text comments describing why the data structure was replaced as the active data structure 614, authorizations or credentials used to approve the data structure's replacement as the active data structure 614, a user identifier identifying who authorized and/or executed the data structure's replacement as the active data structure 614, and so forth. The active history 610 may be stored in the same database tables as the library of data structure options 612 with fields that identify each record as being part of the active history. Alternatively, the active history 610 may be stored in separate database tables. The active history 610 can be examined at any time and a sequential list of previous active data structures can be generated and evaluated, along with any of the new metadata described above. For example, an output can be generated showing when each data structure was replaced and the user identifier indicating who approved and/or executed the replacement.

Figure 7:
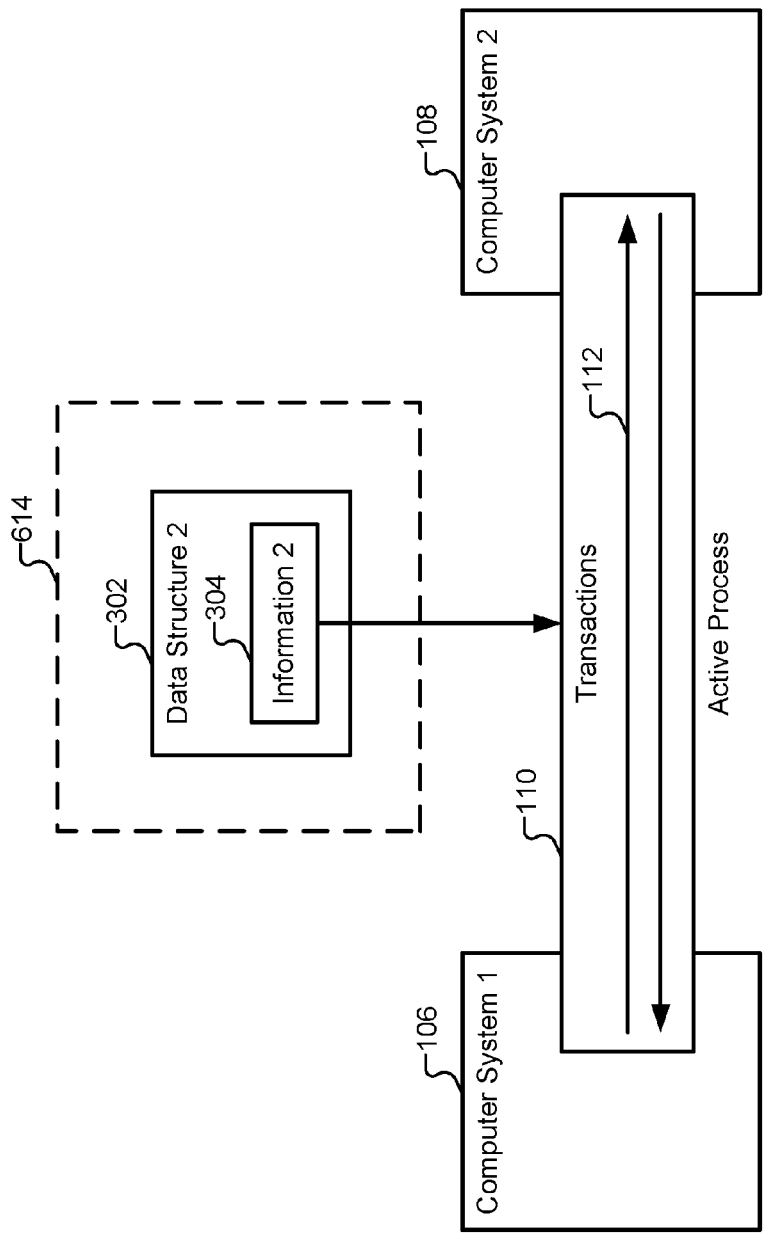
FIG. 7 illustrates a flow diagram of transactions when a data structure is replaced as the active data structure, according to some embodiments.

FIG. 7 illustrates a flow diagram of transactions when a data structure is replaced as the active data structure 614, according to some embodiments. FIG. 7 is similar to FIG. 1, the difference being that the first data structure 102 governing the transactions 112 has been replaced by the second data structure 302 as the active data structure 614. When this type of replacement occurs, past transactions need not be altered or affected. Transactions occurring after the replacement of the active data structure 614 can proceed under the values of the new active data structure 614. For example, transactions scheduled for once a month prior to the replacement may now be executed twice per month. Value amounts or types of data transferred with each transaction may be different in future transactions. Despite these changes, replacing the active data structure 614 does not interfere with the overall execution of the active process 110. Instead, the transition is seamless when viewed by the first computer system 106 and/or the second computer system 108.

Figure 8:
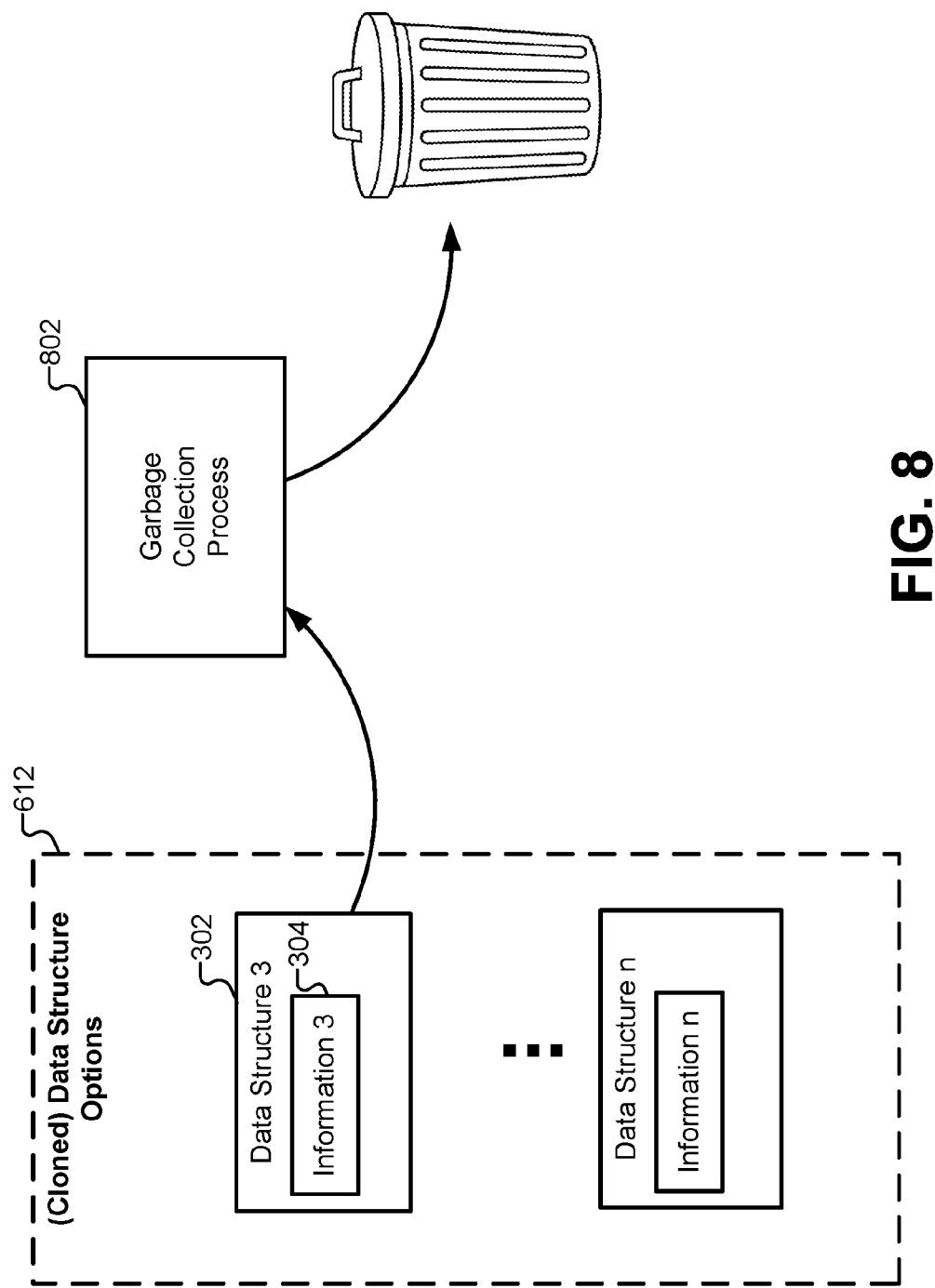
FIG. 8 illustrates a cleanup process for managing a library of clone options, according to some embodiments.

FIG. 8 illustrates a cleanup process for managing the library of clone options 612, according to some embodiments. Because data structure options are often created in order to compare their corresponding result sets to the result sets of an existing active process, that comparison may in some cases indicate that certain data structure options are not preferable. There is, however, some value in maintaining a set of data structure options that have not been used as the active process. This can allow users to see different data structures that have already been evaluated. Users can also generate and store sequences of data structures that can be implemented at regular time intervals over the lifetime of the active process 110. Users can also create data structures that may not be optimal at a current time, but may become optimal in the future time when external factors that may affect the active process 110 change.

However, to prevent the library of data structure options 612 from growing too large, a garbage collection process 802 can periodically cull the library of data structure options 612 and remove data structure options that are no longer viable. Depending on the particular embodiment, a number of different garbage collection schemes may be implemented. In some embodiments, garbage collection can be managed by a user. Each data structure option may include a flag or field that may indicate that the data structure can be garbage collected. In some embodiments, garbage collection may operate based on when a data structure option was last used and/or evaluated. For example, the garbage collection process 802 can remove data structure options that have not been evaluated for at least a predetermined time interval. In some embodiments, data structure options may be flagged for garbage collection only after they have been evaluated and had a corresponding result set generated. Data structure options that have not yet been run through the simulation process 204 would not be marked for garbage collection.

The embodiments described above for managing transactions 112 using a data structure that can be replaced in an uninterrupted fashion can be applied to many different types of applications. In one example, a data structure can be used to govern the allocation of network resources. The data structure can store information, such as available resource identifiers, known latencies, available network connections, and/or a set of logical rules that define how and when network requests are connected to network resources. The active process may include an ongoing set of network resource requests that are serviced by a centralized system that governs the use of the shared resources. Different resource allocation algorithms can be developed by changing the information stored in the data structure to alter how resource requests are handled, maximum allocation times, user priorities, and so forth. Because the exact pattern of future resource allocation requests is generally unknown, the simulation process can provide possible resource request patterns based on historical patterns. The simulation process can then provide result sets that can be analyzed to determine which resource allocation algorithm most efficiently allocates the resources when viewed holistically. A network administrator can then select a particular result set and implement a new resource allocation algorithm by changing the information in the data structure. The ongoing transactions that service resource requests can be altered in real-time and continuously processed without interruption.

In another example, data structures may be used to represent various algorithms that govern how an optimizer can most efficiently execute Structured Query Language (SQL) statements in a relational database system. SQL queries may be carried out by causing the execution of one or more SQL statements. SQL statements may be executed in a variety of ways, some of which may be more efficient than others and/or may consume fewer systems resources. To process an SQL statement, the SQL statement may be passed to an optimizer to determine the most efficient way to execute and produce the result of the query. The optimizer may include a data structure that includes logical rules and/or threshold values representing a general algorithm for parsing and optimizing SQL statements. The determination of the execution plan by the optimizer may be an important step in the processing of any SQL statement and can greatly affect execution time.

The optimizer may determine the most efficient way to execute the SQL statement after considering many factors related to objects and conditions specified in the query. The rules by which the optimizer optimizes execution of an SQL statement may utilize statistics describing the database schema. While the exact nature of future SQL queries may not be known, statistical information based on previous queries may be fed through the optimizer, which acts as a simulation process, according to some embodiments. For a simulation, the optimizer can produce a result set that represents a cost of carrying out the query in terms of, for example, physical disk I/O, execution time, processor operations, database reads/writes, and so forth. To test different algorithms, the database administrator can alter the existing data structure that governs the optimization rules, and then simulate different sequences of historical SQL statement executions. A plurality of result sets representing the cost of carrying out each SQL statement execution can be presented to the database administrator, and the most efficient result set in terms of cost may be selected. The data structure corresponding to the selected results can then be used to govern the ongoing transactions (i.e., the optimization of SQL statement executions) from that point forward in the active process of managing the relational database system.

In some embodiments, the transactions of the active process may include Data Manipulation Language (DML) statements. In the art, DML statements include programming language constructs for selecting, inserting, deleting, and/or updating data in a database. In the example above, the transactions included SQL statements that were processed by the relational database system by an optimizer for execution. Other types of DML statements may also be used, including DML forms used by b IMS/DLI and CODASYL databases. In some embodiments, DML statements may be included in the payload of the data transactions of the active process between a client device and a server. The data structure may be used to govern how the DML statements are executed, parsed, stored, constructed, and so forth. For example, one embodiment may use a data structure to determine how DML statements are automatically generated by a process to extract data from a database. In another example, a data structure may include rules that govern how DML statements are parsed for different database schemas. In another example, a data structure may be used to govern an order in which a batch of DML statements are processed by a relational database management system. In each of these examples, the data transaction itself includes DML statements, and the ways in which the DML statements are constructed, processed, parsed, executed, and/or the like, during the active process of handling these transactions is governed by a data structure including logical rules, threshold values, business logic rules, and so forth.

In some embodiments, data structures can be used to govern periodic email transmissions to a large customer base. Some embodiments may use data structures to provide settings for network routers and govern bandwidth to minimize latency. Some embodiments may use data structures to provide values that govern crawl and search schemes for searching large data sets. Of the many types of applications that can use the embodiments described above, a particular application involving executing electronic transfers to satisfy a lease agreement will be described briefly below. This particular application involving lease agreements and lease options is merely exemplary and not meant to be limiting. It is provided only as an example of one of the many different applications that can use the embodiments described above.

Leasing is complex and data intensive process. A corporate lessee may need to evaluate many factors such as security deposits, rent escalations, operating expenses, market conditions, and so forth before choosing the best lease option. For example, the decision to lease or buy may depend on the lease costs over the useful life of the asset being leased versus the outright purchase cost of the asset. Prior to this disclosure, the industry lacked a tool or ERP systems that could collate all the data and present different lease option models in a way that would help the lessee make an optimal leasing decision based on lease costs over a period of time. For instance, a lessee while negotiating the rent terms for a property may need to analyze what rental terms might be profitable based on historical sales. It might be more profitable to acquire a lease with a fixed base rent amount and a small percentage of sales overage rather than a higher percentage of sales overage and variable rent.

Some embodiments may use the data structures used to manage active transactions to manage lease agreements. A simulation process 204 specifically designed to model lease data allows the user to configure different parameters in the controlling data structure and cloned data structure options using different lease terms and models. The user can compare various models and choose the data structure option with the best result set, i.e., the best leasing option that fits the business requirements and budgets of the user. After establishing the lease of the active process, the user can model lease renegotiations with the lessor and make any necessary adjustments to the selected model through the cloning and information editing technique described above. Some embodiments allow data structures to also model and compare scenarios where the asset being leased can be purchased outright.

Figure 9:
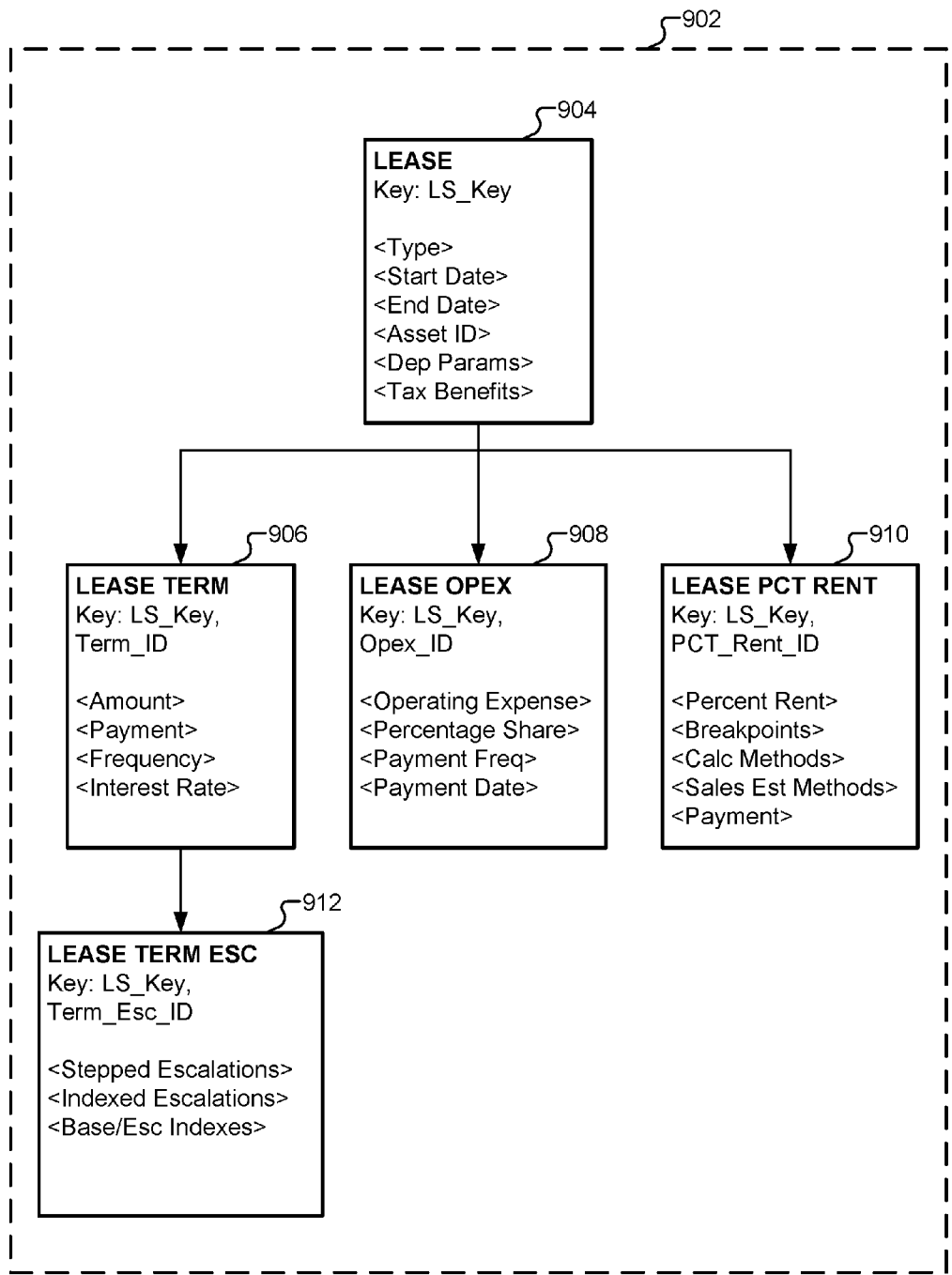
FIG. 9 illustrates an active data structure used to govern transactions, according to some embodiments.

FIG. 9 illustrates an active data structure 902 used to govern transactions, according to some embodiments. Continuing with the example of leasing transactions, the active process 110 may refer to a lease relationship for a particular asset. This active process will include numerous data transfers between a first computer system 106 of the lessee and a second computer system 108 of the lessor. The transactions 112 will occur periodically throughout the lifetime of the lease relationship. The transactions 112 may include data transfers representing payments of the lease directly between the lessee and the lessor. In some embodiments, the transactions 112 may be executed between the computer system of financial institutions representing the lessee and/or the lessor.

The active data structure 902 stores the terms of the lease agreement. These terms dictate the frequency of the transactions and amounts sent in the transactions 112 throughout the lifetime of the active process 110 representing the lease relationship for the asset. The active data structure 902 may be comprised of a plurality of entries in different relational database tables. For example, a lease table 904 may include descriptive information such as a start date and an end date for the lease, an asset identifier, tax benefits, and so forth. A lease term table 906 may include information such as a lease amount, a payment amount, a payment frequency, an interest rate, and so forth. A lease operating expense table 908 may include values such as an operating expense, a percentage share, a payment frequency, payment dates, and so forth. A lease percentage rent table 910 may include values such as a percent rent, breakpoints, calculation methods, sales estimate methods, and so forth. A lease term escalation table 912 may include values such as step escalations, indexed escalations, base/escalation indices, and so forth.

The values stored in these tables 904, 906, 908, 910, 912 may be used to govern the payment frequency and amounts for the active process 110 of the loan. Additionally, the values stored in these tables 904, 906, 908, 910, 912 of the active data structure 902 may be fed into the simulation process 204 to generate result sets for the lifetime of the lease agreement. This result set may include total values paid over the lifetime the lease (e.g., principle, interest, insurance, taxes, rent, etc.). The result set from the simulation process 204 may be compared to other results sets from other lease options that may be available.

Figure 10:
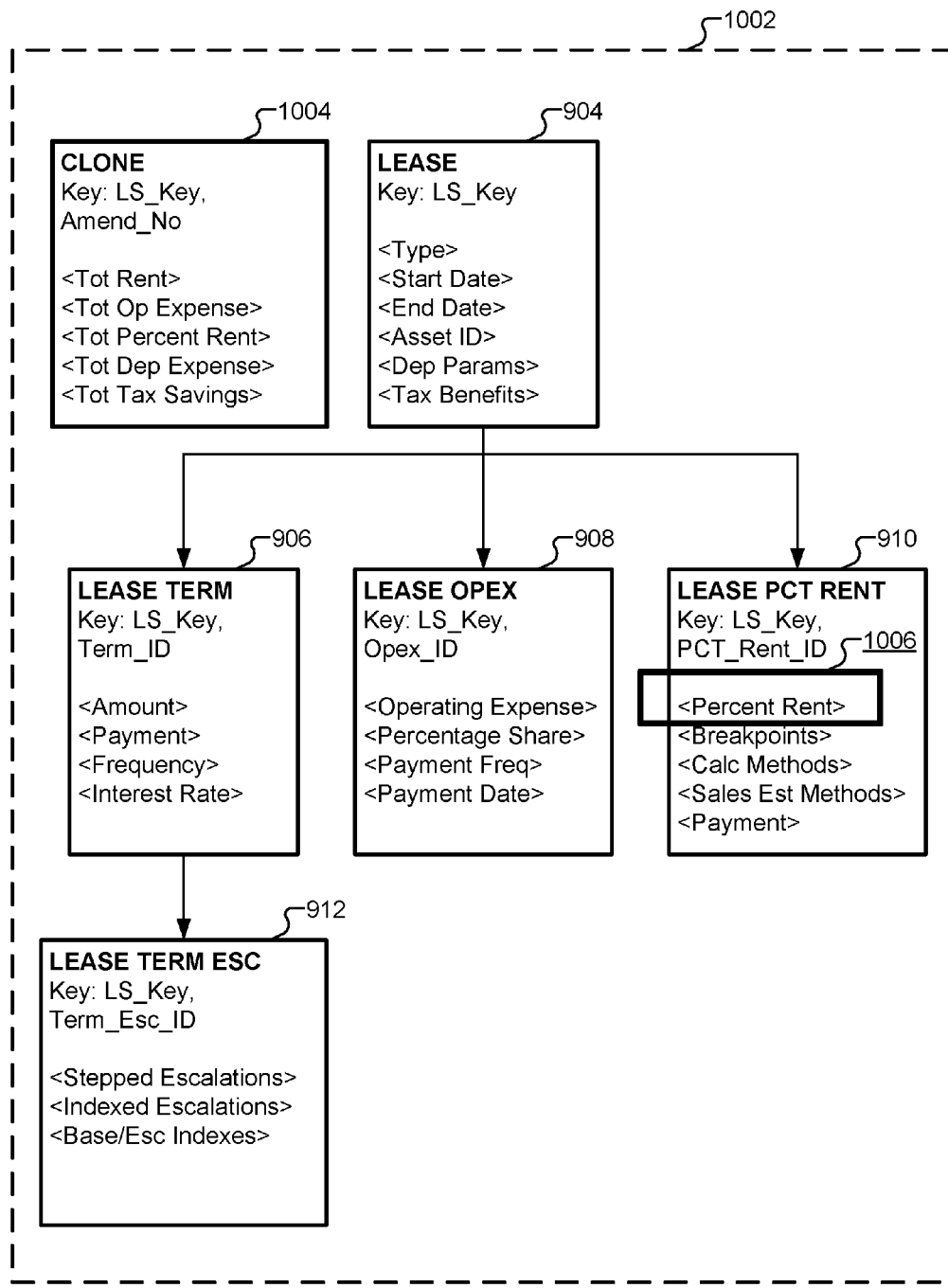
FIG. 10 illustrates a cloned data structure, according to some embodiments.

After the lease is initiated and the active process 110 has begun executing transactions 112 on the lease, a user can develop new lease options that may be available for renegotiation. To generate a new lease option, the user can clone a version of the active data structure 902 and alter values via the user interface 202 in the new data structure. FIG. 10 illustrates a cloned data structure 1002, according to some embodiments. Initially, the cloned data structure 1002 may include all the same table entries and data values that were stored in the original active data structure 902. In some embodiments, the cloned data structure 1002 may include additional entries in a clone table 1004 that lists values of the result set created through the simulation process 204, such as total rent, total operating expenses, total rent percentage, total depreciation expense, total tax savings, and so forth.

As described above, each data structure created for a particular active process may include a process identifier that links the data structure to the active process. In this example using a lease relationship, the "LS Key" in value each of the tables 904, 906, 908, 910, 912 serves as the process identifier linking each entry in these tables to the active process 110 of a particular lease. As new lease options are cloned from the active data structure 902, the clones will include an incremented amendment identifier (e.g., "Amend No" in clone table 1004) that uniquely identifies each clone the data structure.

A user or an automated process can vary individual values stored in the cloned data structure 1002 in order to see the effect on the lifetime values in the result set after the simulation process 204 executes. For example, a value for the rent percentage 1006 in the lease percentage rent table 910 can be adjusted up or down to see the effect of different interest rates on the totals in the result set.

Figure 11:
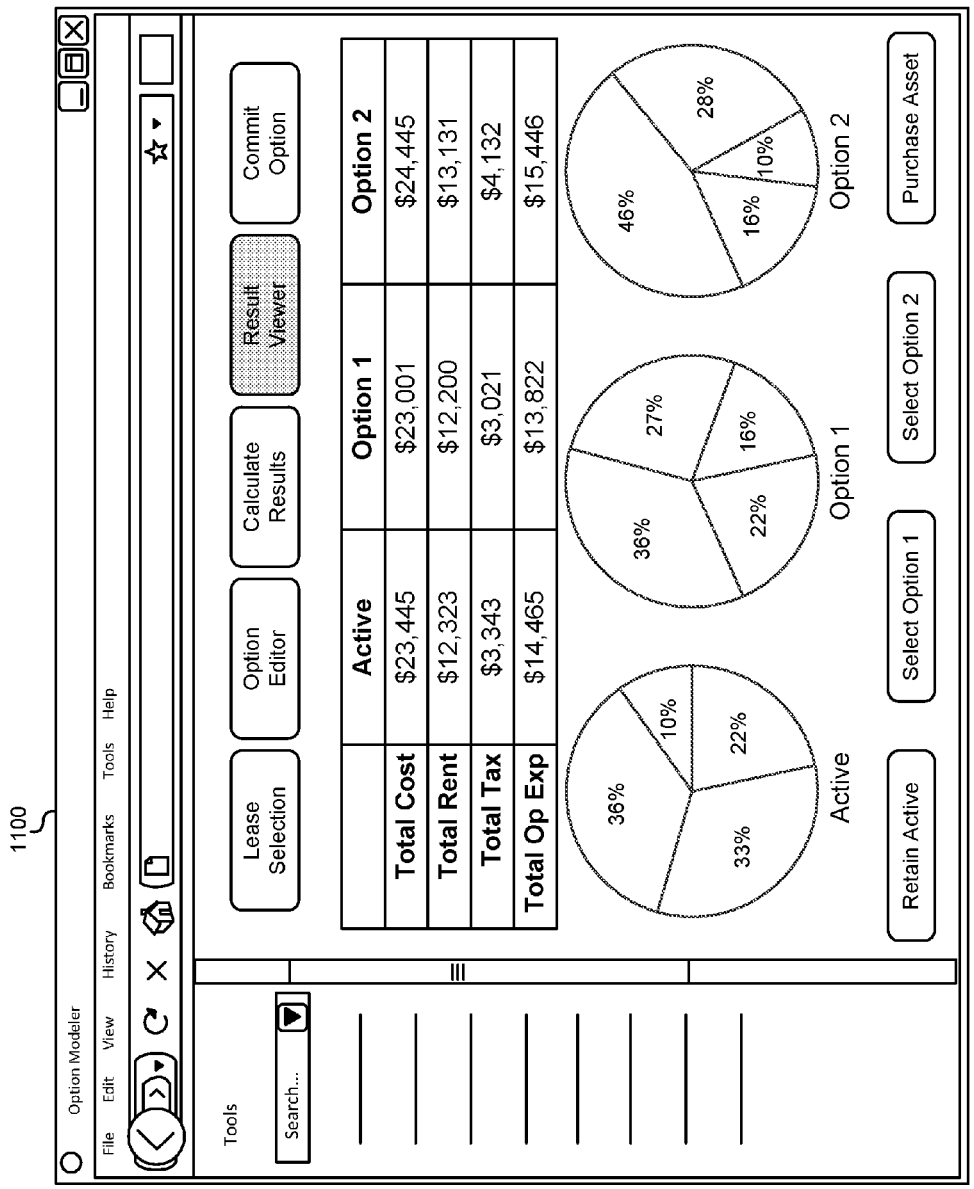
FIG. 11 illustrates a user interface that may be displayed on a display device, according to some embodiments.

As described above, the active data structure 902 can be submitted to the simulation process 204 along with any cloned data structures, such as cloned data structure 1002, and the corresponding result sets can be displayed in a comparative fashion on display device. FIG. 11 illustrates a user interface 1100 that may be displayed on a display device, according to some embodiments. In this example, the result set of the active data structure is shown alongside the results sets from two different cloned data structures labeled "Option 1" and "Option 2." Totals for rent, tax, and operating expenses are extracted from each result set and displayed next to each other in the user interface 1100. Other data summary techniques, such as pie charts, bar graphs, etc., may also be used to compare corresponding values in each result set.

As part of the simulation process, all of the lease option parameters in the data structures will be considered and exploded across the term of the lease. The calculation may consider rent escalations based on market indices, percentage rent based on sales, depreciation percentage, operating expenses, and so forth. The simulation may also calculate the total lease cost for each option setup. A score may be calculated based on the most favorable option. The comparison chart illustrated by FIG. 11 may be presented to the user in a 2-D format with options and costs. The total cost of each option may be listed on each option. The user may be provided an option to choose and activate the preferred lease option, or to initiate a purchase option for that asset. After selection, the lease option may activate the selected option and create a lease with the information in the selected data structure. An option to buy the asset will create a purchase order and route it through a PO approval and buy out process of an ERP software package. If the selected data structure is updating an existing lease, the lease option may create a new lease agreement for the asset or update the existing lease, depending on the lease relationship. In either case, any future transactions on the active process of the lease will continue uninterrupted as governed by the new selected data structure.

Figure 12:
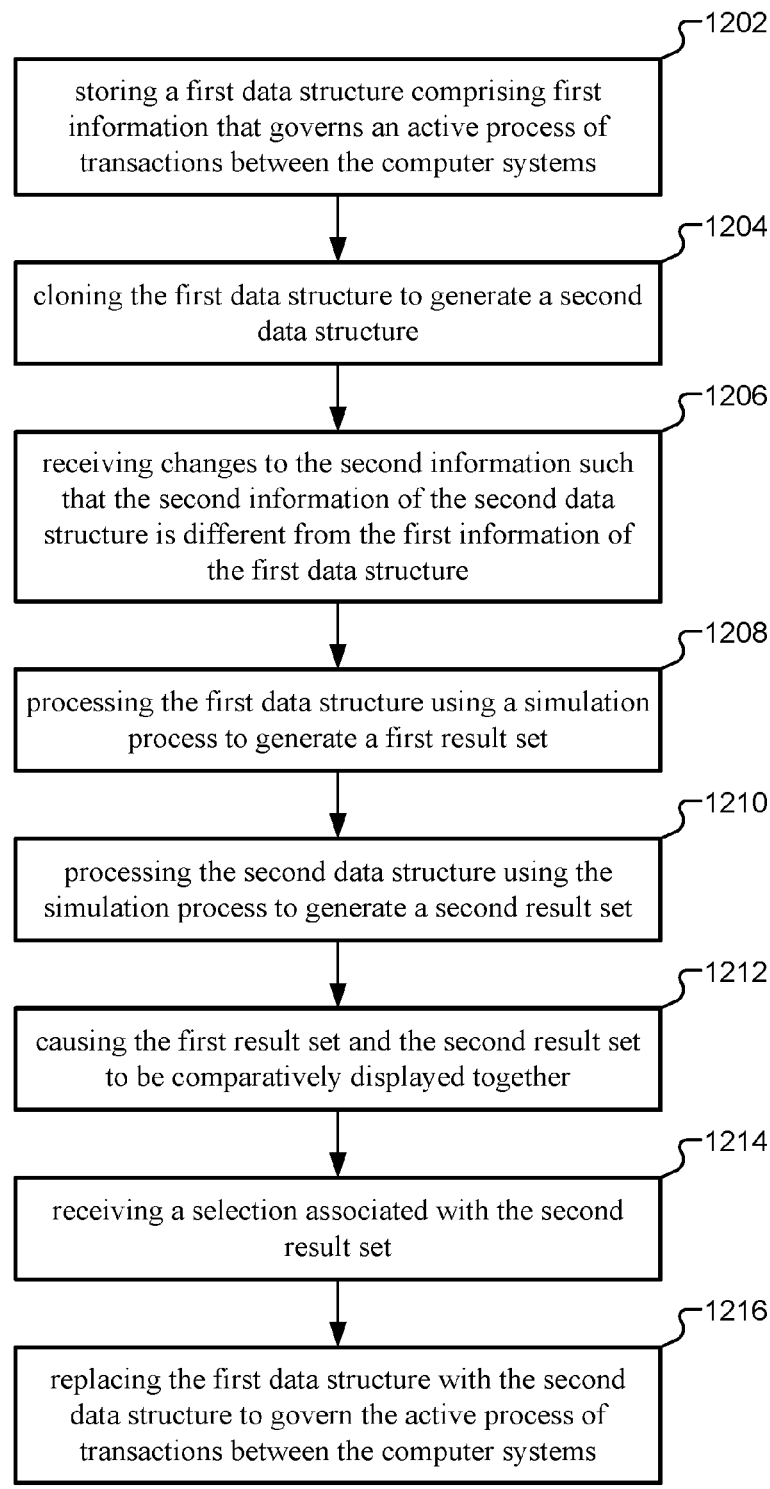
FIG. 12 illustrates a flowchart for a method of replacing information governing transactions between computer systems.

FIG. 12 illustrates a flowchart for a method of replacing information governing transactions between computer systems. The method may include storing a first data structure comprising first information that governs an active process of transactions between the computer systems (1202). The method may also include cloning the first data structure to generate a second data structure (1204). In some embodiments, the second data structure may include second information that is a clone of the first information. The method may additionally include receiving changes to the second information such that the second information of the second data structure is different from the first information of the first data structure (1206).

The method may also include processing the first data structure using a simulation process to generate a first result set (1208). The first result set may include simulation results of transactions between the computer systems over a future time interval as governed by the first information. The method may additionally include processing the second data structure using the simulation process to generate a second result set (1210). The second result set may include simulation results of transactions between the computer systems over the future time interval as governed by the second information.

The method may further include causing the first result set and the second result set to be comparatively displayed together on a display device (1212), and receiving a selection associated with the second result set (1214). The method may also include replacing the first data structure with the second data structure to govern the active process of transactions between the computer systems (1216).

It should be appreciated that the specific steps illustrated in FIG. 12 provide particular methods of replacing information governing transactions between computer systems according to various embodiments of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
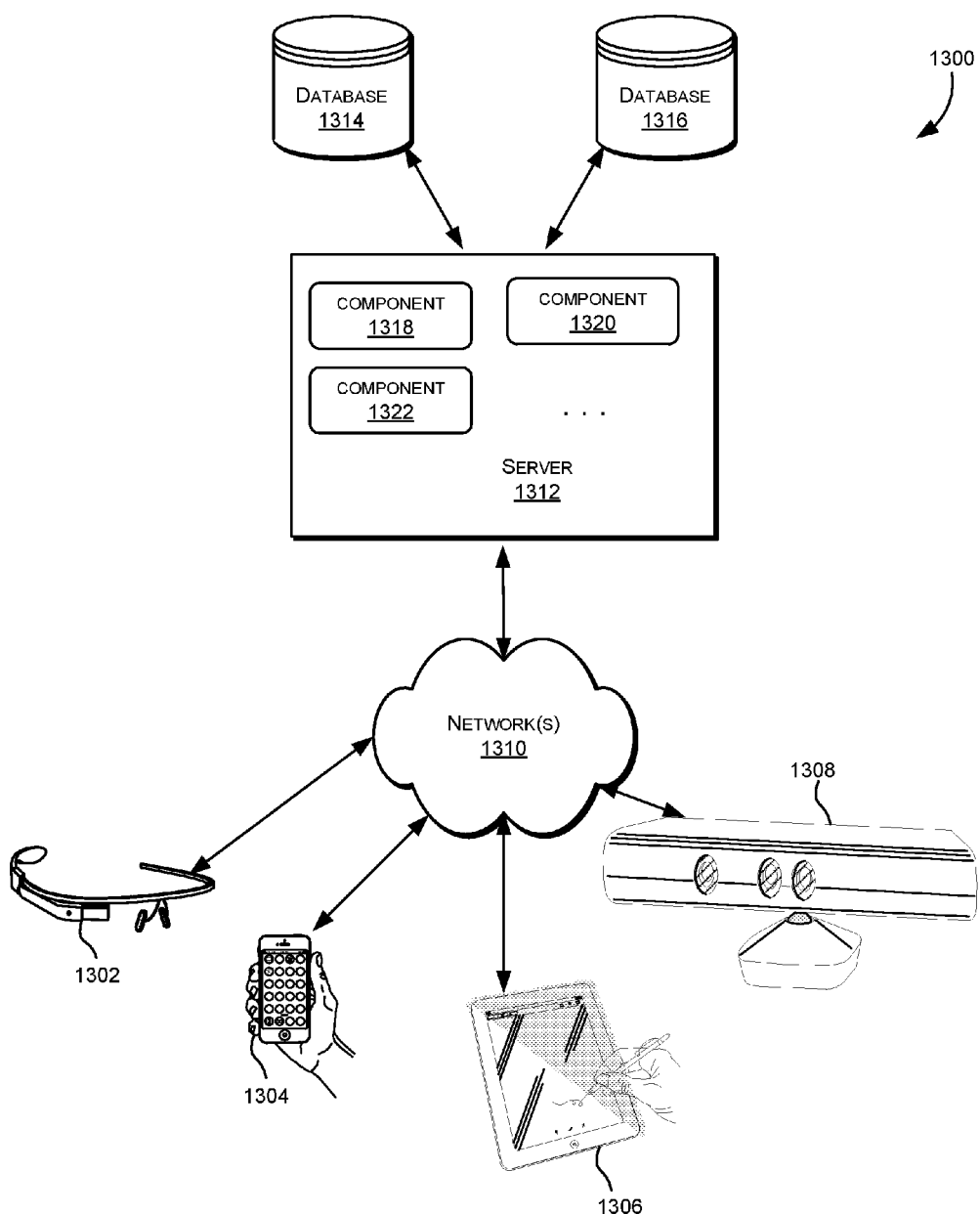
FIG. 13 illustrates a simplified block diagram of a distributed system for implementing some of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s)

1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
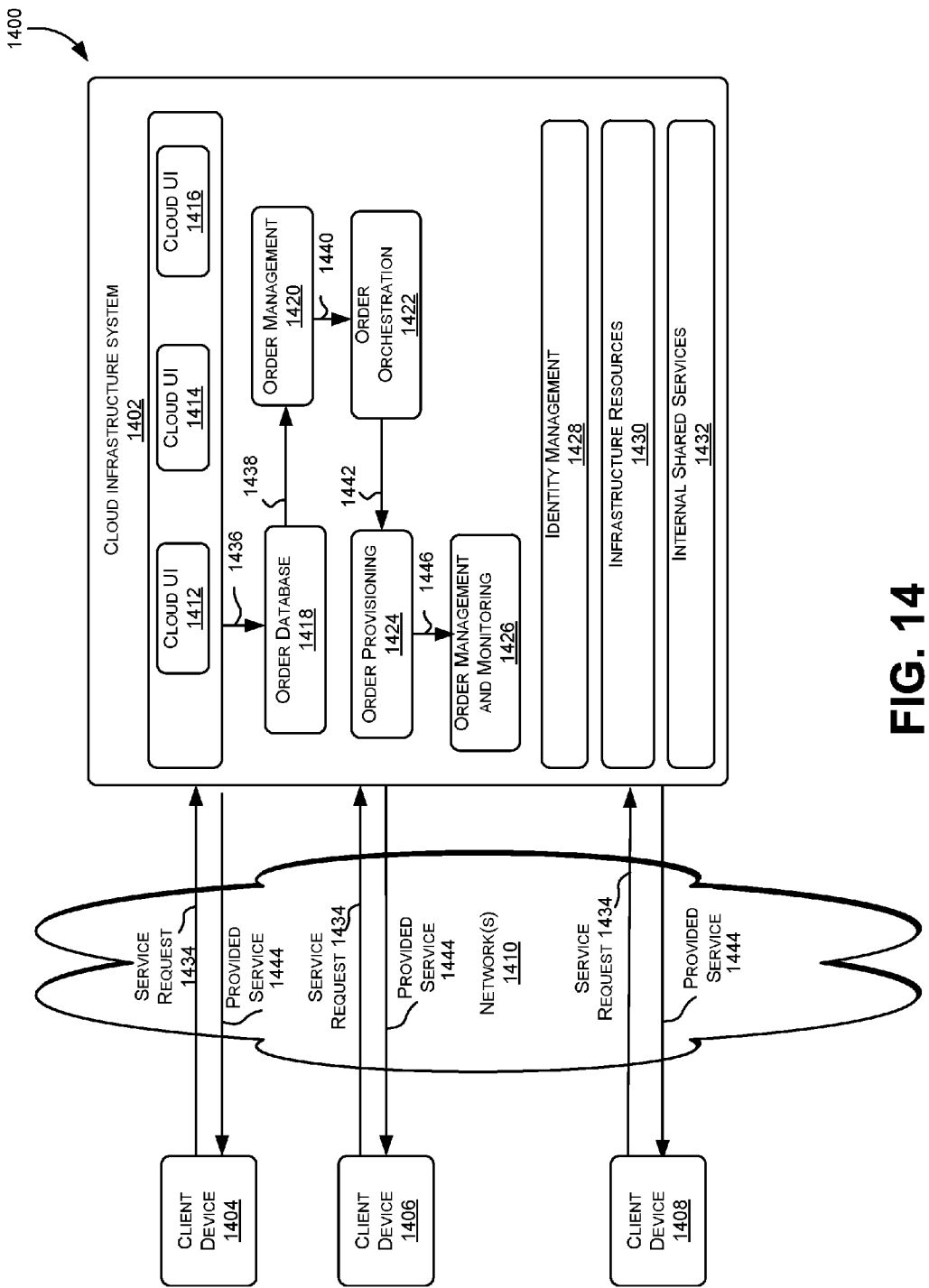
FIG. 14 illustrates a simplified block diagram of components of a system environment by which services provided by the components of an embodiment system may be offered as cloud services.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate an embodiment of the invention. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
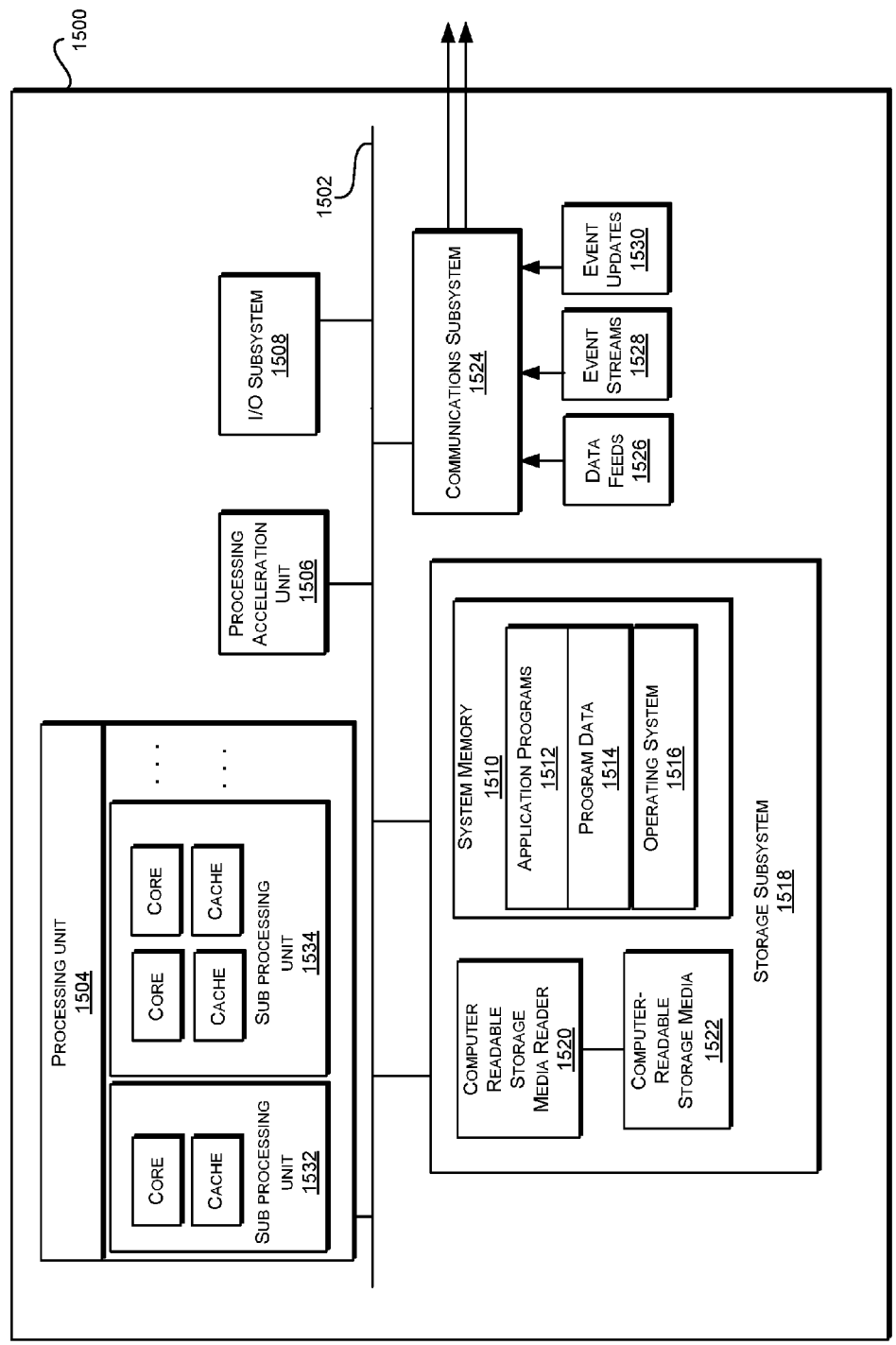
FIG. 15 illustrates an exemplary computer system, in which various embodiments may be implemented.

FIG. 15 illustrates an exemplary computer system 1500, in which various embodiments of the present invention may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of replacing information governing transactions between computer systems, the method comprising:
   storing a first data structure comprising:
      first information that governs an active process of transactions between the computer systems, the first information identifying one or more original terms of a lease agreement, wherein at least one transaction was previously executed by the active process previously occurred in accordance with the one or more original terms;
      a process identifier that, via inclusion of the process identifier in the first data structure, links the first data structure to the active process; and
      a first amendment identifier that distinguishes the first data structure from one or more other data structures linked to the active process;

cloning the first data structure to generate a second data structure, wherein the second data structure comprises:
  second information that is a clone of the first information;
  the process identifier that, via inclusion of the process identifier in the second data structure, links the second data structure to the active process; and
  a second amendment identifier that is different than the first amendment identifier;
receiving changes to the second information such that the second information of the second data structure is different from the first information of the first data structure, wherein the change adjusts at least one of the one or more original terms of the lease agreement prospectively but preserves an indication that the at least one transaction occurred in accordance with the one or more original terms;
processing the first data structure using a simulation process to generate a first result set comprising one or more first simulation results of transactions between the computer systems over a future time interval as governed by the first information, the one or more first simulation results being generated to reflect the at least one transaction previously executed and simulated first future transactions corresponding to the one or more original terms;
processing the second data structure using the simulation process to generate a second result set comprising one or more second simulation results of transactions between the computer systems over the future time interval as governed by the second information, the one or more second simulation results being generated to reflect the at least one transaction previously executed and simulated second future transactions corresponding to the adjusted at least one of the one or more original terms;
generating a first total metric for the one or more original terms based on the one or more first simulation results;
generating a second total metric for the adjusted at least one of the one or more original terms based on the one or more second simulation results;
causing the first result set and the second result set to be comparatively displayed together on a display device;
causing the first total metric and the second total metric to be comparatively displayed together on the display device;
receiving a selection associated with the second result set; and
replacing the first data structure with the second data structure to govern the active process of transactions between the computer systems.

2. The method of claim 1, wherein the first data structure governs the transactions between the computer systems by determining when data are sent between the computer systems, wherein the data comprises one or more Data Manipulation Language (DML) statements.

3. The method of claim 1, wherein the first data structure governs the transactions between the computer systems by determining what data values are sent between the computer systems.

4. The method of claim 1, wherein replacing the first data structure with the second data structure to govern the active process of transactions between the computer systems comprises:
  permitting the transactions between the computer systems to continue uninterrupted when the second data structure replaces the first data structure.

5. The method of claim 1, further comprising causing a user interface to be displayed, wherein the user interface comprises a plurality of fields, and wherein the plurality of fields are populated with the second information.

6. The method of claim 5, further comprising receiving the changes to the second information through the plurality of fields of the user interface.

7. The method of claim 1, wherein the changes to the second information comprises information that changes a duration of the transactions between the computer systems.

8. A non-transitory, computer-readable medium comprising instructions which, when executed by one or more processors, causes the one or more processors to perform operations comprising:
  storing a first data structure comprising:
    first information that governs an active process of transactions between computer systems, the first information identifying one or more original terms of a lease agreement, wherein at least one transaction was previously executed by the active process previously occurred in accordance with the one or more original terms;
    a process identifier that, via inclusion of the process identifier in the first data structure, links the first data structure to the active process; and
    a first amendment identifier that distinguishes the first data structure from one or more other data structures linked to the active process;
  cloning the first data structure to generate a second data structure, wherein the second data structure comprises:
    second information that is a clone of the first information;
    the process identifier that, via inclusion of the process identifier in the second data structure, links the second data structure to the active process; and
    a second amendment identifier that is different than the first amendment identifier;
  receiving changes to the second information such that the second information of the second data structure is different from the first information of the first data structure, wherein the change adjusts at least one of the one or more original terms of the lease agreement prospectively but preserves an indication that the at least one transaction occurred in accordance with the one or more original terms;
  processing the first data structure using a simulation process to generate a first result set comprising one or more first simulation results of transactions between the computer systems over a future time interval as governed by the first information, the one or more first simulation results being generated to reflect the at least one transaction previously executed and simulated first future transactions corresponding to the one or more original terms;
  processing the second data structure using the simulation process to generate a second result set comprising one or more second simulation results of transactions between the computer systems over the future time interval as governed by the second information, the one or more second simulation results being generated to reflect the at least one transaction previously executed and simulated second future transactions corresponding to the adjusted at least one of the one or more original terms;
  generating a first total metric for the one or more original terms based on the one or more first simulation results;

generating a second total metric for the adjusted at least one of the one or more original terms based on the one or more second simulation results;

causing the first result set and the second result set to be comparatively displayed together on a display device;

causing the first total metric and the second total metric to be comparatively displayed together on the display device;

receiving a selection associated with the second result set; and replacing the first data structure with the second data structure to govern the active process of transactions between the computer systems.

9. The non-transitory computer-readable medium according to claim 8 wherein the instructions cause the one or more processors to perform additional operations comprising:

cloning the first data structure to generate a third data structure, wherein the third data structure comprises third information that is a clone of the first information, the process identifier, and a third amendment identifier;

receiving changes to the third information such that the third information of the third data structure is different from the first information of the first data structure and different from the second information of the second data structure;

processing the third data structure using the simulation process to generate a third result set comprising simulation results of transactions between the computer systems over the future time interval as governed by the third information; and causing the third result set to be comparatively displayed together with the first result set and the second result set on the display device.

10. The non-transitory computer-readable medium according to claim 9 wherein the instructions cause the one or more processors to perform additional operations comprising, after receiving the selection associated with the second result set:

storing the third data structure in a library of cloned data structure options for the active process that have not been used to govern the transactions between the computer systems.

11. The non-transitory computer-readable medium according to claim 10 wherein the instructions cause the one or more processors to perform additional operations comprising, after storing the third data structure in the library of cloned data structure options:

garbage collecting the library of cloned data structure options to delete data structures based on a length of time since the data structures were processed by the simulation process.

12. The non-transitory computer-readable medium according to claim 10 wherein the instructions cause the one or more processors to perform additional operations comprising, after storing the third data structure in the library of cloned data structure options:

garbage collecting the library of cloned data structure options to delete data structures based on a length of time since the first data structure was replaced by the second data structure.

13. The non-transitory computer-readable medium according to claim 9 wherein the instructions cause the one or more processors to perform additional operations comprising, after receiving the selection associated with the second result set:

storing the first data structure in a history of data structures for the active process that have been used to govern the transactions between the computer systems.

14. The non-transitory computer-readable medium according to claim 8 wherein the first data structure comprises a plurality of rows in a plurality of relational database tables, wherein each of the plurality of relational database tables represents an aspect of the active process of transactions between the computer systems.

15. A system comprising:

one or more processors; and one or more memory devices comprising instructions which, when executed by the one or more processors, cause the one or more processors to perform operations comprising:

storing a first data structure comprising:

first information that governs an active process of transactions between computer systems, the first information identifying one or more original terms of a lease agreement, wherein at least one transaction was previously executed by the active process previously occurred in accordance with the one or more original terms;

a process identifier that, via inclusion of the process identifier in the first data structure, links the first data structure to the active process; and a first amendment identifier that distinguishes the first data structure from one or more other data structures linked to the active process;

cloning the first data structure to generate a second data structure, wherein the second data structure comprises:

second information that is a clone of the first information;

the process identifier that, via inclusion of the process identifier in the second data structure, links the second data structure to the active process; and a second amendment identifier that is different than the first amendment identifier;

receiving changes to the second information such that the second information of the second data structure is different from the first information of the first data structure, wherein the change adjusts at least one of the one or more original terms of the lease agreement prospectively but preserves an indication that the at least one transaction occurred in accordance with the one or more original terms;

processing the first data structure using a simulation process to generate a first result set comprising one or more first simulation results of transactions between the computer systems over a future time interval as governed by the first information, the one or more first simulation results being generated to reflect the at least one transaction previously executed and simulated first future transactions corresponding to the one or more original terms;

processing the second data structure using the simulation process to generate a second result set comprising one or more second simulation results of transactions between the computer systems over the future time interval as governed by the second information, the one or more second simulation results being generated to reflect the at least one transaction previously executed and simulated second future transactions corresponding to the adjusted at least one of the one or more original terms;

generating a first total metric for the one or more original terms based on the one or more first simulation results;

generating a second total metric for the adjusted at least one of the one or more original terms based on the one or more second simulation results;

causing the first result set and the second result set to be comparatively displayed together on a display device;

causing the first total metric and the second total metric to be comparatively displayed together on the display device;

receiving a selection associated with the second result set; and replacing the first data structure with the second data structure to govern the active process of transactions between the computer systems.

16. The system of claim 15 wherein the first total metric comprises a predicted aggregate total of first data values over a lifetime of the active process.

17. The system of claim 16 wherein causing the first total metric and the second total metric to be comparatively displayed together on the display device comprises causing the predicted aggregate total of first data values in the first result set to be displayed next to a predicted aggregate total of first data values of the second result set.

18. The system of claim 15 wherein the first data structure governs the transactions between the computer systems by:

determining when data are sent between the computer systems; and determining what data values are sent between the computer systems.

19. The system of claim 15, wherein the first data structure governs the transactions between the computer systems by determining when data are sent between the computer systems, wherein the data comprises one or more Data Manipulation Language (DML) statements.

20. The system of claim 15 wherein the first data structure governs the transactions between the computer systems by determining what data values are sent between the computer systems.

* * * * *

UNITED STATES PATENT AND TRADEMARK OFFICE
CERTIFICATE OF CORRECTION

PATENT NO. : 9,898,203 B2
APPLICATION NO. : 15/160286
DATED : February 20, 2018
INVENTOR(S) : Shaw et al.

Page 1 of 1

It is certified that error appears in the above-identified patent and that said Letters Patent is hereby corrected as shown below:

On the Title Page

On page 2, Column 2, under Other Publications, Line 3, delete "defauft.aspx]." and insert -- default.aspx]. --, therefor.

On page 2, Column 2, under Other Publications, Line 6, delete "tease" and insert -- lease --, therefor.

Signed and Sealed this
Twenty-first Day of August, 2018

Andrei Iancu
*Director of the United States Patent and Trademark Office*